(12) United States Patent
Frerichs (10) Patent No.: US 10,071,604 B2
(45) Date of Patent: Sep. 11, 2018

(54) PNEUMATIC VEHICLE TIRE AND METHOD FOR MAKING A PNEUMATIC VEHICLE TIRE

(71) Applicant: Continental Reifen Deutschland GmbH, Hannover (DE)

(72) Inventor: Udo Frerichs, Langenhagen (DE)

(73) Assignee: Continental Reifen Deutschland GmbH, Hannover (DE)

( * ) Notice: Subject to any disclaimer, the term of this patent is extended or adjusted under 35 U.S.C. 154(b) by 258 days.

(21) Appl. No.: 14/923,138

(22) Filed: Oct. 26, 2015

(65) Prior Publication Data

US 2016/0039252 A1 Feb. 11, 2016

Related U.S. Application Data

(63) Continuation of application No. PCT/EP2014/051987, filed on Feb. 3, 2014.

(30) Foreign Application Priority Data

Apr. 24, 2013 (DE) .......................... 10 2013 104 114

(51) Int. Cl.
*B60C 9/02* (2006.01)
*B60C 9/18* (2006.01)
(Continued)

(52) U.S. Cl.
CPC ............ *B60C 19/084* (2013.01); *B29D 30/08* (2013.01); *B60C 9/0207* (2013.01);
(Continued)

(58) Field of Classification Search
CPC ........... B60C 1/0041; B60C 9/00; B60C 9/02; B60C 9/18; B60C 19/08; B60C 19/084; B60C 19/086
See application file for complete search history.

(56) References Cited

U.S. PATENT DOCUMENTS 4,794,967 A * 1/1989 Charvet .............. B60C 15/0027
152/539
4,930,560 A * 6/1990 Lesti ................... B60C 15/0027
152/510
(Continued)

FOREIGN PATENT DOCUMENTS

GB 544757 A 4/1942
JP 2008149905 A 7/2008
(Continued)

OTHER PUBLICATIONS

International Search Report dated Apr. 1, 2014 of international application PCT/EP2014/051987 on which this application is based.

*Primary Examiner* — Justin R Fischer
(74) *Attorney, Agent, or Firm* — Walter Ottesen, P.A.

(57) ABSTRACT

A pneumatic vehicle tire has a carcass with at least one carcass ply. The surface of the carcass ply has an overlay made of an electrically conductive rubber mixture. The overlay extends continuously from an electrically conductive bead base to a superstructure and contacts the superstructure. A method for making a pneumatic vehicle tire includes the steps of making a carcass ply, covering a surface of the carcass ply with a continuous overlay made of an electrically conductive rubber mixture. The overlay contacts an electrically conductive bead base and the superstructure in the finished pneumatic vehicle tire.

10 Claims, 4 Drawing Sheets (51) Int. Cl.
*B60C 19/08* (2006.01)
*B60C 15/00* (2006.01)
*B29D 30/08* (2006.01)
*B60C 15/06* (2006.01)

(52) U.S. Cl.
CPC ...... *B60C 15/0018* (2013.01); *B60C 15/0045* (2013.01); *B60C 19/088* (2013.01); *B29D 2030/088* (2013.01); *B60C 2009/0215* (2013.01); *B60C 2015/0614* (2013.01)

(56) References Cited

U.S. PATENT DOCUMENTS

| | | | |
|---|---|---|---|
| 5,173,137 A * | 12/1992 | Okihara | B60C 15/0027 152/548 |
| 6,269,854 B1 | 8/2001 | Matsuo et al. | |
| 2005/0103412 A1* | 5/2005 | Zanzig | B60C 15/06 152/152.1 |
| 2010/0277027 A1 | 11/2010 | Kaiser et al. | |
| 2013/0174951 A1 | 7/2013 | Schunack et al. | |

FOREIGN PATENT DOCUMENTS

| | | |
|---|---|---|
| JP | 2008308083 A | 12/2008 |
| JP | 2010018123 A | 1/2010 |
| JP | 2010208524 A | 9/2010 |
| JP | 2012183656 A | 9/2012 |

\* cited by examiner

PNEUMATIC VEHICLE TIRE AND METHOD FOR MAKING A PNEUMATIC VEHICLE TIRE

CROSS REFERENCE TO RELATED APPLICATIONS

This application is a continuation application of international patent application PCT/EP2014/051987, filed Feb. 3, 2014, designating the United States and claiming priority from German application 10 2013 104 114.0, filed Apr. 24, 2013, and the entire content of both applications is incorporated herein by reference.

FIELD OF THE INVENTION

The invention relates to a pneumatic vehicle tire having a superstructure, a carcass and two tire beads, each having a bead base, wherein the carcass extends from one bead base to the other bead base via the superstructure, wherein the superstructure and at least one bead base are of electrically conductive configuration, wherein the carcass is not of electrically conductive configuration and has at least one carcass ply, the surface of which has an overlay made of electrically conductive material. The invention furthermore relates to a method for producing a pneumatic vehicle tire of this kind.

BACKGROUND OF THE INVENTION

Vehicles can become electrically charged as they are driven. To avoid discharge processes, provision must be made for adequate dissipation of the electrostatic charges. In order to be able to dissipate the electrostatic charge, tire components are made electrically conductive, presenting an electrically conductive path from the contact surface of the pneumatic vehicle tire with the roadway to the contact region of the pneumatic vehicle tire with the tire rim. This can be accomplished through the use of electrically conductive rubber mixtures, for example.

Development is now moving toward reducing the rolling resistance of the tire. One approach to reducing rolling resistance is to use rubber mixtures with a low rolling resistance. The hysteresis of these rubber mixtures with a low rolling resistance can be reduced above all by the use of low-activity fillers, smaller quantities of filler or by the replacement of carbon black by silica. However, the use of these rubber mixtures with a low rolling resistance leads to an increase in the electrical resistance of these rubber mixtures, with the result that the electrical conductivity falls. The required electrical resistance of the overall tire of at most $1 \times 10^8$ $\Omega$ to enable the electrostatic charge to be dissipated cannot be ensured.

An electrically conductive material is intended to mean a material, the electrical conductivity of which is such that the tire has an electrical resistance of at most $1 \times 10^8$ $\Omega$. An electrically nonconductive rubber mixture is intended to mean a rubber mixture with which the tire has an electrical resistance greater than $1 \times 10^8$ $\Omega$.

What are referred to as conductive carbon blacks in very small concentrations are often used as a remedy. However, these have a reinforcing/stiffening effect and also have a negative effect on hysteresis behavior and thus on rolling resistance. Moreover, such a measure based on conductive carbon blacks is expensive. Thus development is moving toward reducing the use of electrically conductive rubber mixture in the pneumatic vehicle tire.

United States patent application publication 2013/0174951 discloses a pneumatic vehicle tire having a carcass, wherein elements in the form of threads which are of electrically conductive configuration are arranged on at least one of the two surfaces of the carcass, thereby improving the electrical conductivity of the pneumatic vehicle tire. To achieve this, after the production of the carcass component in a calender, the elements in the form of threads are applied to at least one surface of the carcass. The problem here is that the carcass is exposed to severe stresses during tire production. If, for example, the elements in the form of threads do not have sufficient stretch, reliable dissipation of the electrostatic charge is not guaranteed since the elements in the form of threads tear and the electrically conductive path is interrupted. When using materials other than rubber in the pneumatic vehicle tire, provision must furthermore be made to ensure connection to the rubber matrix. Additional preparation steps are often necessary for this purpose. This increases the expense and complexity of the production process.

SUMMARY OF THE INVENTION

It is an object of the invention to provide a pneumatic vehicle tire which reliably ensures the electrical conductivity of the pneumatic vehicle tire by simple means and with a low outlay on construction. It is furthermore the underlying object of the invention to provide a method via which a pneumatic vehicle tire of this kind can be produced in a simple manner.

The stated object is achieved in respect of the pneumatic vehicle tire by virtue of the fact that the overlay is an electrically conductive rubber mixture, that the carcass ply extends from the electrically conductive bead base to the superstructure, wherein the overlaid surface of the carcass ply makes contact with the superstructure and the electrically conductive bead base, that the overlay extends continuously on the surface of the carcass ply from the electrically conductive bead base to the superstructure and that the overlay makes electrical contact both with the electrically conductive bead base and with the superstructure, with the result that the electrically conductive bead base and the superstructure are connected to one another in an electrically conductive manner.

Here, the electrically conductive superstructure forms a conductive connection between the tire surface coming into contact with the surface of the roadway and the overlay of the carcass ply. In particular, the term "superstructure" refers to the components including the tread, the belts and the intermediate layers between the abovementioned components. The bead base is a region of the bead which connects the carcass and the contact surface with the tire rim to one another. The electrically conductive bead base forms a conductive connection between the overlay of the carcass ply and the contact surface of the pneumatic vehicle tire with the tire rim. In its two-dimensional extent, the carcass ply has two extended outer surfaces, each forming one surface of the carcass ply.

One advantage is that the electrical conductivity of the pneumatic vehicle tire is reliably ensured by the simple measure of overlaying a carcass ply. It is ensured that the dissipation of the electrostatic charge from the tire rim can take place reliably via the pneumatic vehicle tire to the roadway.

It is furthermore advantageous that the overlaid region of the carcass ply in the pneumatic vehicle tire extends in such a way that the overlay makes contact with the electrically conductive bead base and the electrically conductive superstructure and thus that an electrically conductive path is established from the tire surface which comes into contact with the surface of the roadway to the contact surface with the tire rim.

As regards requirements in production and in the use of pneumatic vehicle tires, rubber mixtures have been tested in many ways. Critical requirements, such as adequate elasticity, are thus met. The overlay made of an electrically conductive rubber mixture ensures a reliable electrically conductive path from the superstructure to the electrically conductive bead base.

It is furthermore advantageous that the overlay extends along a carcass ply and, in the structure of the tire, can be regarded as part of this carcass ply. Thus, the pneumatic vehicle tire does not have an additional component and there is no need for any expensive configuration measure on the tire.

Thus the pneumatic vehicle tire provided reliably ensures the electrical conductivity of the pneumatic vehicle tire by simple means and with a simple structural configuration. Electrostatic charge can be dissipated reliably from the vehicle to the roadway.

Another advantage is that the other layers of the side wall, such as the inner liner, the carcass and/or the sidewall strips, are formed from electrically nonconductive material and can be optimized in respect of rolling resistance, for example. It is thus also possible to avoid the use of other electrically conductive materials, such as metal. The use of these materials is often expensive since, for example, adhesion to the rubber mixture must be ensured.

Figure 1:
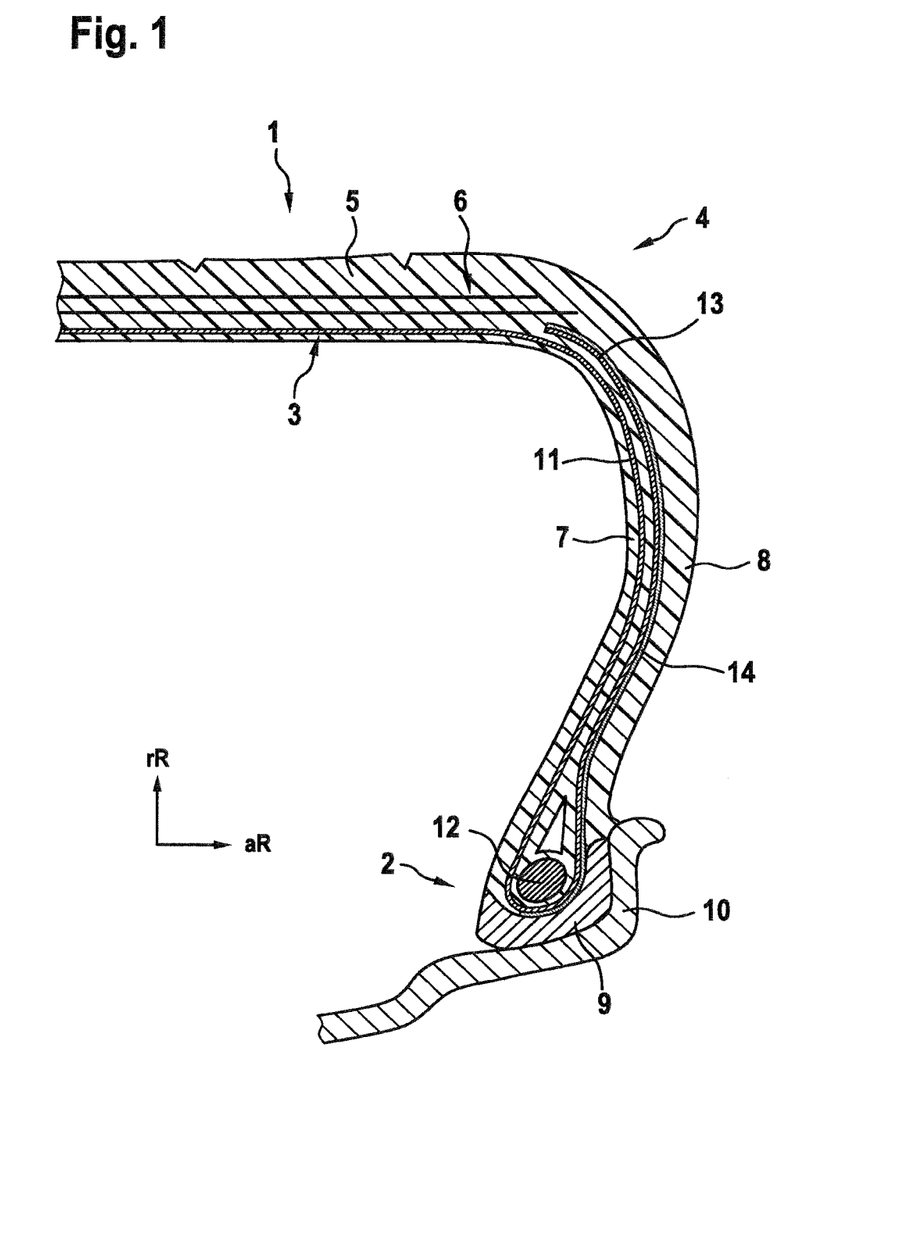
FIG. 1 shows the right-hand side of a radial partial section through a tire rim and a pneumatic vehicle tire according to the invention with a carcass having a C-carcass ply.
Figure 2:
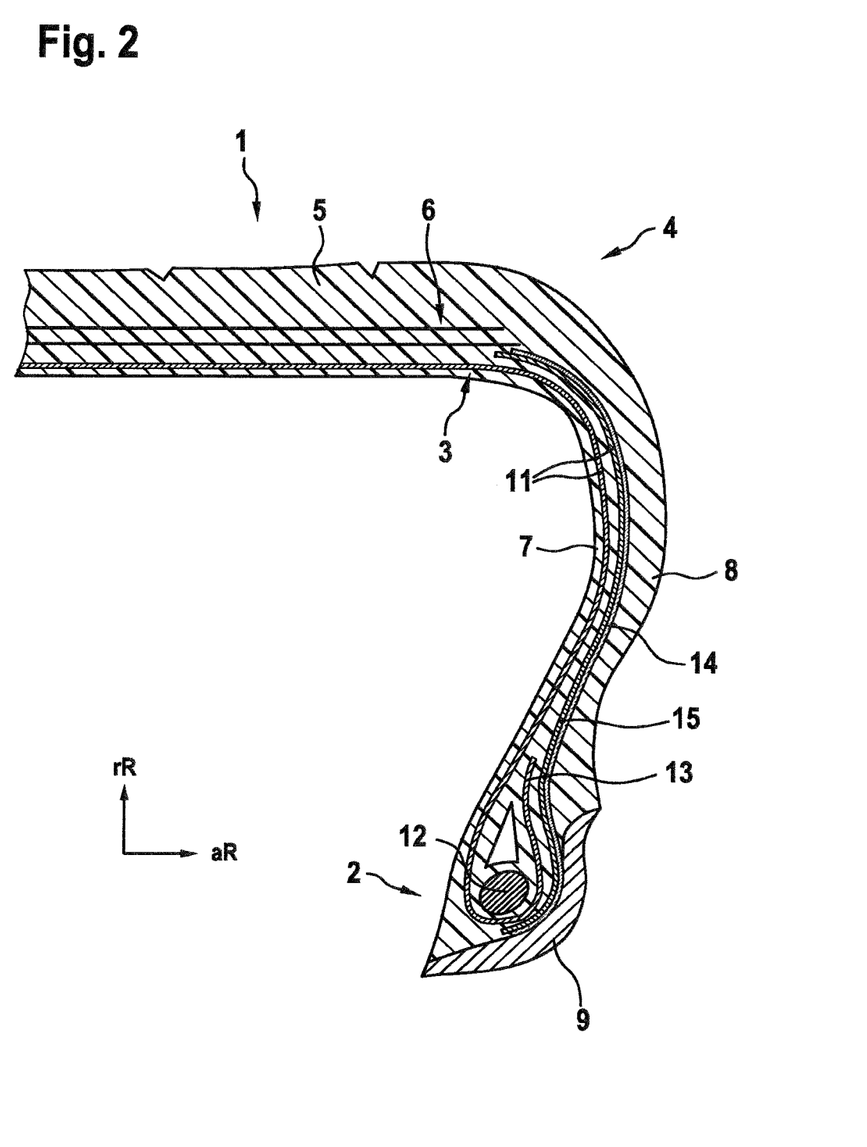
FIG. 2 shows the right-hand side of a radial partial section through a pneumatic vehicle tire according to the invention with a carcass having a floating carcass ply; and, FIG. 3 and FIG. 4 each show a radial partial section through a pneumatic vehicle tire according to the invention with a carcass having a split carcass ply.

It is expedient if the overlay extends axially on the outside in relation to the carcass, between the superstructure and the electrically conductive bead base. In the case of a carcass which has a C-carcass ply or a floating carcass ply, it is thereby possible to achieve the electrical conductivity of the tire in a reliable and simple manner. The C-carcass ply is taken around the bead core from the axial inside to the axial outside and, axially on the outside, ends in a carcass turnup, which extends as far as the superstructure. The floating carcass ply extends between a bead base and the superstructure as an axially outermost ply of the carcass. It ends in the region of the bead and in the region of the superstructure. The axially outer surface of the carcass turnup or floating carcass ply has the continuous overlay, which makes contact both with the superstructure and with the electrically conductive bead base. An illustrative embodiment of an overlaid C-carcass ply and an overlaid floating carcass ply are shown in FIG. 1 and FIG. 2 respectively.

Figure 3:
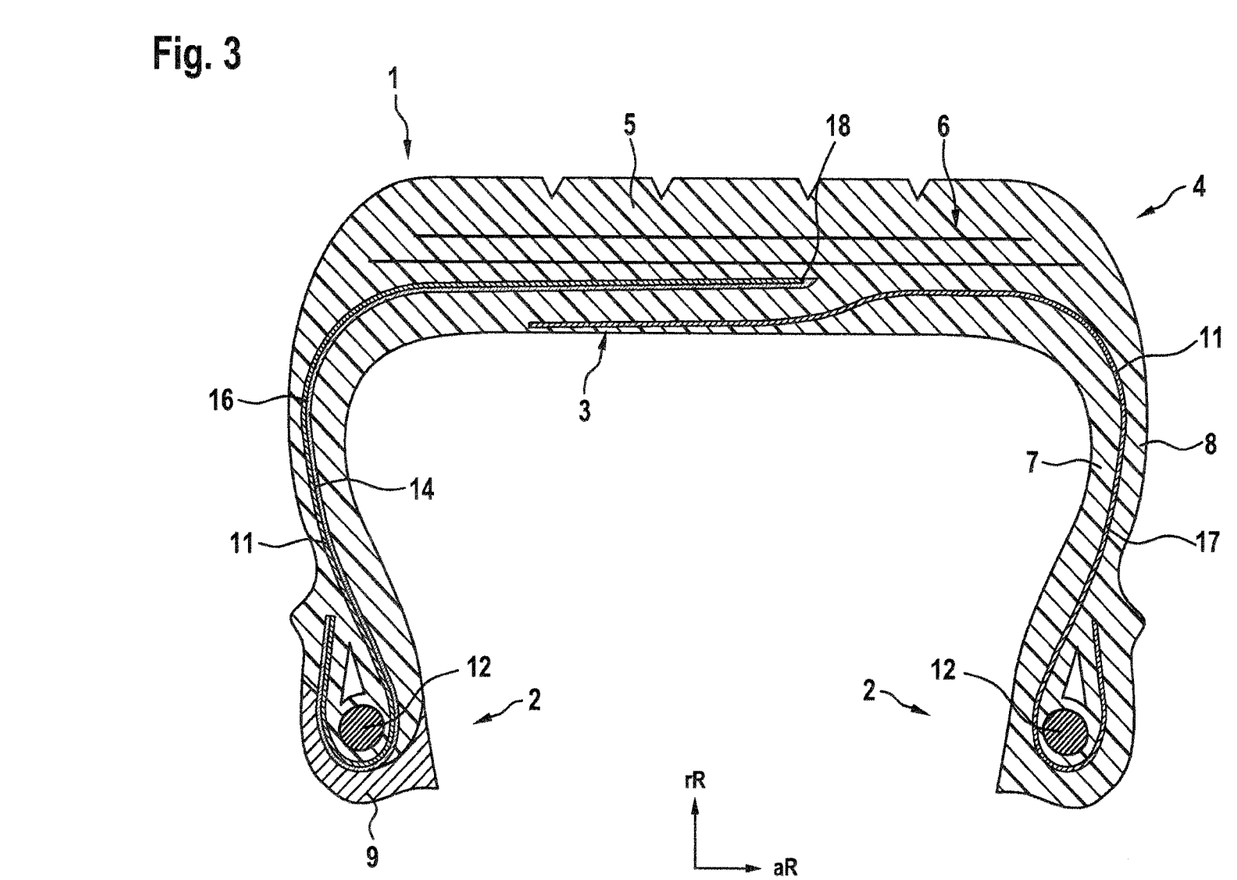
Figure 4:
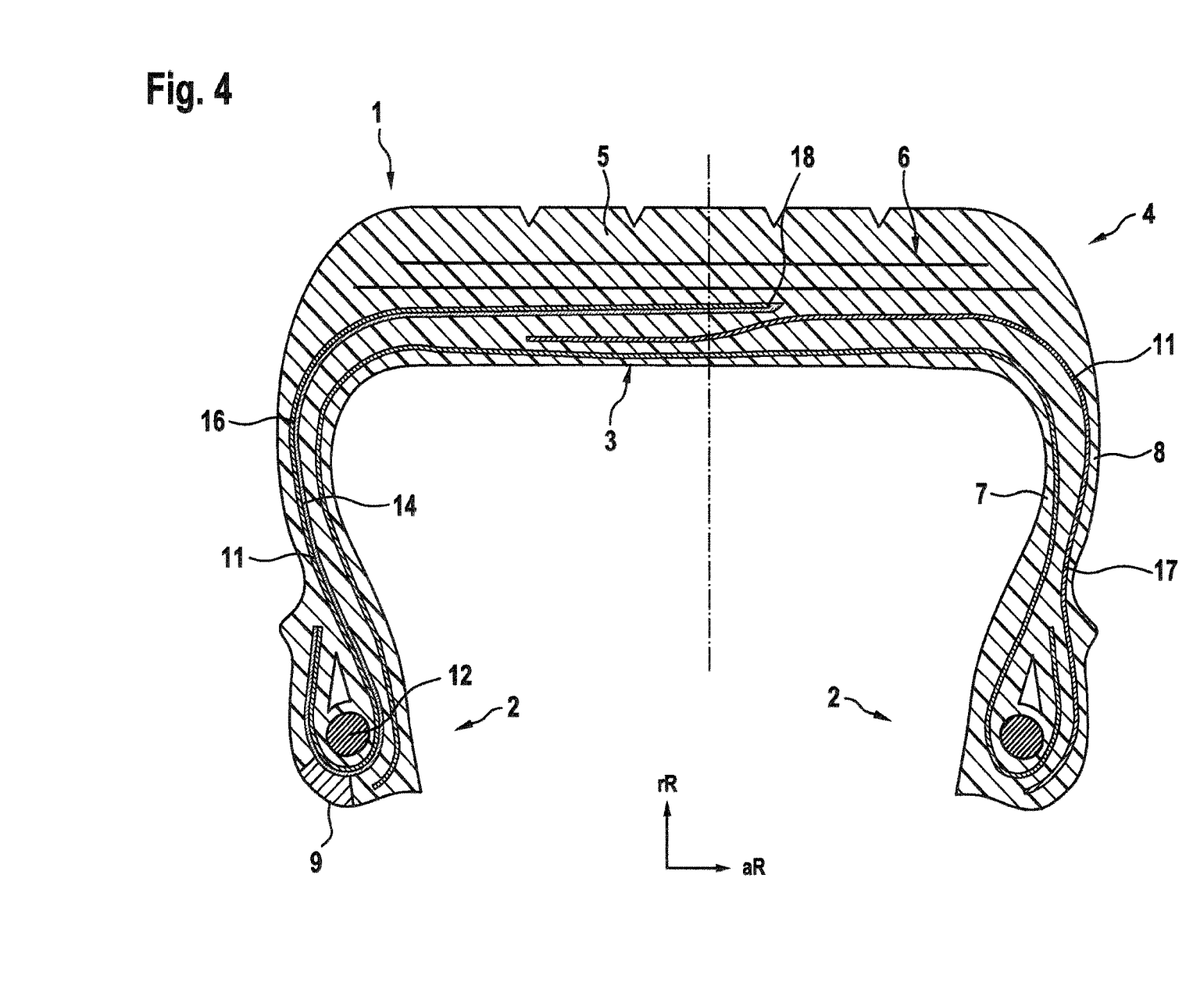

It is furthermore expedient if the carcass ply ends in the region of the superstructure and makes contact with the superstructure at least at its endpoint, if the overlay extends axially on the inside on the carcass ply, between the electrically conductive bead base and the superstructure, and if, in the region of the superstructure, the overlay extends as far as the endpoint of the carcass ply or beyond and makes contact with the superstructure and also with the electrically conductive bead base. Here, the endpoint of the carcass ply in the region of the superstructure is regarded as belonging to both surfaces of the carcass ply. It is thereby possible, in the case of a split carcass ply, to ensure the electrical conductivity of the tire in a reliable and simple manner. In this case, the split carcass ply extends from one tire bead, via the superstructure, to the other tire bead and is split in the circumferential direction in the region of the superstructure. The two carcass ply parts can overlap in the region of the superstructure. The overlaid carcass ply can be one carcass ply part of a split carcass ply. Two illustrative embodiments of a split carcass ply, each with an overlaid carcass ply part, are shown in FIG. 3 and FIG. 4.

It is expedient if the overlay extends over the entire circumference or over at least a partial region of the circumference of the pneumatic vehicle tire. In particular, this can be a matter of one or more strips, in particular 3 to 30 strips, in particular 4 to 20 strips, in particular 5 to 10 strips, of an electrically conductive rubber mixture, which each make contact continuously with the electrically conductive bead base and the superstructure and are arranged in a manner distributed over the circumference of the tire. It is thereby possible to achieve reliable dissipation of the electric charge with a reduced quantity of rubber. In particular, the strips can be arranged in an equidistant manner. It is thereby possible to achieve uniform mass distribution over the circumference of the pneumatic vehicle tire.

It is furthermore expedient if the overlay extends over the entire length of the carcass ply or over at least a partial region of the length. Here, the length of the carcass ply is the length of extent from one end to the other of the carcass ply along the carcass ply perpendicularly to the circumferential direction of the pneumatic vehicle tire. Overlaying the entire length of the carcass ply makes it a simple matter to use a carcass ply that has not yet been cut to length for different tire configurations and reduces the complexity of production. Via an overlay which extends over only a partial region of the length of the carcass, it is possible to minimize the quantity of electrically conductive rubber mixture.

It is expedient if the thickness of the overlay is 0.005 mm to 6.0 mm, in particular 0.01 mm to 2.5 mm, in particular 0.05 mm to 1.2 mm. It is thus possible to make the overlay thin, in particular thinner than other layers of the side region of a pneumatic vehicle tire, for example, the carcass, inner liner or sidewall strips. By ensuring the electrical conductivity via the overlay made of an electrically conductive rubber mixture, it is thus possible to keep down the quantity of electrically conductive rubber mixture in the side region of the pneumatic vehicle tire.

It is advantageous if both tire beads have an electrically conductive bead base and both electrically conductive bead bases are connected in an electrically conductive manner to the superstructure by an overlay. It can also be a matter here of an overlay which extends from one bead base to the other bead base via the superstructure.

The method for making a pneumatic vehicle tire of this kind takes place with the following steps:
   a) producing the carcass ply,
   b) covering a surface of the carcass ply with a continuous overlay made of an electrically conductive rubber mixture, wherein the overlay in the finished pneumatic vehicle tire makes contact with an electrically conductive bead base and the electrically conductive superstructure,
   c) arranging the carcass ply with the overlay on a tire building drum,
   d) finishing the carcass,
   e) finishing the pneumatic vehicle tire via further steps.

This provides a method via which it is possible in a simple matter to produce a vehicle tire which reliably ensures the electrical conductivity of the pneumatic vehicle tire by simple means and with a simple structural configuration.

It is advantageous here that the electrical conductivity of the pneumatic vehicle tire between the electrically conductive bead base and the superstructure is ensured by just one production step, step b). It is furthermore significant that this step affects only the production of the carcass ply. All the other production steps, in particular the assembly of the pneumatic vehicle tire and the structural configuration thereof, are unchanged.

Another advantage is that the other layers of the side wall, such as the inner liner, the carcass and/or the sidewall strips, are formed from electrically nonconductive material and, for example, optimized in respect of rolling resistance.

The carcass ply is a reinforcement ply of the pneumatic vehicle tire. The production of the carcass ply in step a) is accomplished, in particular, by calendering, wherein reinforcements are embedded in a rubber mixture. Here, the reinforcements extend in the longitudinal direction of the carcass ply, that is, in the direction of production of the calender. In the finished pneumatic vehicle tire, the reinforcements of the carcass usually extend transversely to the circumferential direction.

It is expedient if the covering of the carcass ply with the overlay in step b) takes place directly on and/or after the calender. It is thereby possible to accomplish this production step in a simple manner, in particular in a fully automated way.

It is furthermore expedient if the carcass ply is covered with the overlay over its entire width or over at least part of its width in step b). In this case, the width of the carcass ply is the extent transversely to the direction of the longitudinal extent of the reinforcements of the carcass ply. In particular, one or more strips, in particular 3 to 30 strips, in particular 4 to 20 strips, in particular 5 to 10 strips, made of an electrically conductive rubber mixture can be applied with spacing in between. It is thereby possible, using a simple measure, to reduce the quantity of electrically conductive rubber mixture used and, at the same time, to ensure reliable dissipation of the electrostatic charge on the finished pneumatic vehicle tire. In particular, the strips can be arranged in an equidistant manner. Uniform mass distribution is thereby achieved.

It is expedient if the carcass ply is covered with the overlay over its entire longitudinal extent or over at least a partial region of its longitudinal extent in step b). Covering over the entire longitudinal extent allows a continuous covering process, and the carcass ply can be made available in a very simple manner for different pneumatic vehicle tires by cutting it to different lengths. Selective covering of partial regions of the longitudinal extent makes it possible to minimize the quantity of electrically conductive rubber mixture used.

By means of such a method, it is possible in a simple manner to produce a pneumatic vehicle tire, the electrical conductivity of which is reliably ensured by covering a C-carcass ply, a floating carcass ply or a split carcass ply with an overlay made of an electrically conductive rubber mixture.

The invention furthermore relates to a pneumatic vehicle tire which is produced by the method according to the invention.

BRIEF DESCRIPTION OF THE DRAWINGS

The invention will now be described with reference to the drawings wherein.

DESCRIPTION OF THE PREFERRED EMBODIMENTS OF THE INVENTION

FIG. 1 shows the right-hand side of a radial partial section through a pneumatic vehicle tire for a passenger car. The pneumatic vehicle tire 1, which is made of rubber mixtures, includes a radial carcass 3 extending from the right-hand tire bead 2 to the left-hand tire bead (not shown). The pneumatic vehicle tire 1 has a superstructure 4, which has a tread 5 and a belt 6 arranged between the tread 5 and the carcass 3. The superstructure 4, or at least part thereof, is of electrically conductive configuration and forms an electrically conductive connection between the surface of the tread 5 which comes into contact with the surface of the roadway and the carcass 3. The tire bead 2 shown includes an electrically conductive bead base 9, which extends between the carcass 3 and the contact surface with the tire rim 10. The pneumatic vehicle tire 1 furthermore has components adjoining the carcass 3, such as the inner liner 7 and the sidewall strips 8, which adjoin the carcass 3 axially on the inside and axially on the outside in the side region of the pneumatic vehicle tire.

The carcass 3 has a carcass ply 11, which includes an intermediate layer of reinforcements embedded in an electrically nonconductive rubber mixture. This is what is known as a C-carcass ply, which is taken axially from the inside to axially on the outside around high-tensile bead bundles 12 and ends axially on the outside in a carcass turnup 13, which extends as far as the superstructure 4. The axially outer surface of the carcass turnup 13 has an overlay 14 made of an electrically conductive rubber mixture, which extends continuously from the electrically conductive bead base 9 to the superstructure 4 and makes contact both with the electrically conductive bead base 9 and the superstructure 4, as a result of which the electrically conductive bead base 9 and the superstructure 4 are connected to one another in an electrically conductive manner. The electrically conductive bead base 9 has electrically conductive material and forms a conductive connection between the overlay 14 and the contact surface of the pneumatic vehicle tire with the tire rim 10. The pneumatic vehicle tire 1 thus has an electrically conductive path from the contact surface with the tire rim 10 to the contact surface of the tread 5 with the roadway. The overlay 14 has a thickness of 0.08 mm and extends continuously over the entire circumference of the pneumatic vehicle tire 1. The left-hand region (not shown) of the pneumatic vehicle tire 1 can be of similar configuration. However, it may also not have an overlay 14 and/or an electrically conductive bead base 9.

FIG. 2 shows the right-hand side of the radial partial section through another pneumatic vehicle tire 1. In addition to a carcass ply 11, which ends in an outer carcass turnup 13 underneath the superstructure 4, the carcass 3 has what is known as a floating carcass ply 15. This extends continuously as an axially outermost ply of the carcass 3 between the electrically conductive bead base 9 and the superstructure 4 and ends in the respective regions. Its axially outer surface is covered with an overlay 14, which makes contact with the superstructure 3 and the electrically conductive bead base 14 and connects them in an electrically conductive manner. The overlay 14 is a strip with a thickness of 1 mm and an average width of 10 mm. Such strips are arranged at equidistant intervals over the circumference of the tire.

FIG. 3 shows a radial partial section through a pneumatic vehicle tire 1 having a carcass 3 with a split carcass ply, which extends from one tire bead 2 to the other tire bead 2 via the superstructure 4 and is split in the circumferential direction of the pneumatic vehicle tire 1 into two carcass ply parts (16, 17) in the region of the superstructure 4. The two carcass ply parts (16, 17) overlap in the region of the superstructure 4. Carcass ply part 16 ends in the region of the superstructure 4 and makes contact with the latter at the endpoint 18 of carcass ply part 16. The tire bead 2 of the pneumatic vehicle tire 1 which adjoins carcass ply part 16 has an electrically conductive bead base 9. Carcass ply part 16 has an overlay 14 which extends axially on the inside along carcass ply part 16 from the region of the electrically conductive bead base 9 to the endpoint 18 of carcass ply part 16 or beyond and makes contact both with the superstructure 4 and the electrically conductive bead base 9 and connects them in an electrically conductive manner.

FIG. 4 shows another radial partial section through a pneumatic vehicle tire 1. The carcass 3 of the pneumatic vehicle tire has two carcass plies 11, wherein a carcass ply 11 is a carcass ply split into two carcass ply parts (16, 17). As in FIG. 3, carcass ply part 16 has an overlay 14, which connects the electrically conductive bead base 9 to the superstructure 4 in an electrically conductive manner. Here, it is primarily a surface of the split carcass ply, not the surface of the carcass, which is overlaid.

The illustrative embodiments shown in FIGS. 1 to 4 can be produced by means of the method according to the invention.

It is understood that the foregoing description is that of the preferred embodiments of the invention and that various changes and modifications may be made thereto without departing from the spirit and scope of the invention as defined in the appended claims.

LIST OF REFERENCE SIGNS (Part of the Description)
1 pneumatic vehicle tire
2 tire bead
3 carcass
4 superstructure
5 tread
6 belt
7 inner liner
8 sidewall strip
9 electrically conductive bead base
10 tire rim
11 carcass ply
12 bead bundle
13 carcass turnup
14 overlay
15 floating carcass ply
16 carcass ply part
17 carcass ply part
18 endpoint
aR axial direction
rR radial direction

What is claimed is:

1. A pneumatic vehicle tire comprising:
a superstructure;
a carcass;
a first tire bead having a first bead base;
a second tire bead having a second bead base;
said carcass extending from said first bead base via said superstructure to said second bead base;
said superstructure being configured to be electrically conductive;
at least one of said first and said second tire bead bases being configured as an electrically conductive bead base;
said carcass having at least one carcass ply and being configured to be electrically nonconductive;
said carcass ply defining a surface having an overlay of electrically conductive material;
said overlay being an electrically conductive rubber mixture;
said carcass ply extending from said one electrically conductive bead base to said superstructure;
said overlay contacting said superstructure and said one electrically conductive bead base;
said overlay extending continuously on said surface of said carcass ply from said one electrically conductive bead base to said superstructure;
said overlay making electrical contact to said one electrically conductive bead base and said superstructure so as to electrically conductively connect said one electrically conductive bead base to said superstructure;
said carcass ply ending in the region of said superstructure and defining an end point thereat;
said carcass ply contacting said superstructure at least at said end point;
said overlay extending axially on the inside on the carcass ply between said one electrically conductive bead base and said superstructure; and,
said overlay, in the region of said superstructure, extending at least to said end point and contacting said superstructure as well as said one electrically conductive bead base.

2. The pneumatic vehicle tire of claim 1, wherein the pneumatic vehicle tire defines a circumference; and, said overlay extends over the entirety of said circumference or over at least a partial region of said circumference.

3. The pneumatic vehicle tire of claim 1, wherein said carcass ply has a length; and, said overlay extends over the entirety of said length or a partial region of said length.

4. The pneumatic vehicle tire of claim 1, wherein said overlay has a thickness lying in a range of 0.005 mm to 6.0 mm.

5. The pneumatic vehicle tire of claim 1, wherein said overlay has a thickness lying in a range of 0.01 mm to 2.5 mm.

6. The pneumatic vehicle tire of claim 1, wherein said overlay has a thickness lying in a range of 0.05 mm to 1.2 mm.

7. A method for making a pneumatic vehicle tire having an electrically conductive superstructure, two bead bases, and a carcass which extends from one bead base to the other bead base via the superstructure, the superstructure and at least one of the bead bases being configured to be electrically conductive, the carcass being configured electrically non-conductive, the method comprising the steps of:
a) making a carcass ply on a calender;
b) covering a surface of the carcass ply with a continuous overlay made of an electrically conductive rubber mixture in a manner so as to permit the overlay to contact the electrically conductive bead base and the electrically conductive superstructure in the finished pneumatic vehicle tire;
c) arranging the carcass ply with the overlay on a tire building drum;
d) finishing the carcass; and,
e) finishing the pneumatic vehicle tire.

8. The method of claim 7, wherein said covering of the carcass ply with the continuous overlay is done directly on and/or after the calender.

9. The method of claim 7, wherein the carcass ply has a width and in step b) the carcass ply is covered with the overlay over the entirety of the width or at least a portion of the width.

10. The method of claim 7, wherein the carcass ply has a longitudinal extension and in step b) the carcass ply is covered with the overlay over the entirety of the longitudinal extension or at least over a partial region of the longitudinal extension.

* * * * *